US009678568B2

(12) United States Patent
Kakegawa

(10) Patent No.: US 9,678,568 B2
(45) Date of Patent: Jun. 13, 2017

(54) APPARATUS, SYSTEM, METHOD FOR DESIGNATING DISPLAYED ITEMS AND FOR CONTROLLING OPERATION BY DETECTING MOVEMENT

(71) Applicant: CASIO COMPUTER CO., LTD., Tokyo (JP)

(72) Inventor: Satoru Kakegawa, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/597,283

(22) Filed: Jan. 15, 2015

(65) Prior Publication Data

US 2015/0205365 A1 Jul. 23, 2015

(30) Foreign Application Priority Data

Jan. 17, 2014 (JP) ................................ 2014-006719
Nov. 10, 2014 (JP) ................................ 2014-227687

(51) Int. Cl.
*G06F 3/041* (2006.01)
*G06F 3/01* (2006.01)
(Continued)

(52) U.S. Cl.
CPC .............. *G06F 3/013* (2013.01); *G06F 1/163* (2013.01); *G06F 1/1694* (2013.01); *G06F 3/0488* (2013.01)

(58) Field of Classification Search
USPC ............ 345/173, 156, 175, 520; 455/556.1; 715/721; 726/16
See application file for complete search history.

(56) References Cited

U.S. PATENT DOCUMENTS

2011/0053641 A1* 3/2011 Lee ...................... G06F 1/1626 455/556.1
2014/0160078 A1* 6/2014 Seo ........................ G06F 3/017 345/175

(Continued)

FOREIGN PATENT DOCUMENTS

GB 2 281 838 A 3/1995
JP H07-049744 A 2/1995

(Continued)

OTHER PUBLICATIONS

Japanese Office Action dated Jan. 12, 2016 from Japanese Patent Application No. 2014-227687.
Japanese Office Action dated Jun. 28, 2016 in Japanese Patent Application No. 2014-227687.
Boykov, Yuri Y. et al., "Interactive Graph Cuts for Optimal Boundary & Region Segmentation of Objects in N-D Images", Proceedings of "Internation Conference on Computer Vision", Vancouver, Canada, Jul. 2001, vol. I, pp. 105-112.

*Primary Examiner* — Thuy Pardo
(74) *Attorney, Agent, or Firm* — Scully, Scott, Murphy & Presser, P.C.

(57) ABSTRACT

An electronic apparatus is provided. The apparatus has a displaying unit for displaying plural items, the items prepared for giving instructions of performing different operations respectively, a detecting unit for detecting movement, and a controlling unit for, when an item is designated from among the plural items, performing an operation corresponding to the designated item. Further, on the assumption that any of the plural items is designated on the displaying unit and the detecting unit detects movement, the controlling unit changes an indication of the designated item or an indication relating to designated item, displayed on the displaying unit, and on the assumption that other item is designated on the displaying unit and the detecting unit detects movement, changes an indication of the designated other item or an indication relating to designated other item, displayed on the displaying unit.

9 Claims, 11 Drawing Sheets

(51) Int. Cl.
*G06F 1/16* (2006.01)
*G06F 3/0488* (2013.01)

(56) References Cited

U.S. PATENT DOCUMENTS

2014/0168063 A1* 6/2014 Kita ........................ G06F 3/017 345/156
2014/0195915 A1* 7/2014 Iwase ................... G11B 27/034 715/721
2014/0375574 A1* 12/2014 Kim ........................ G06F 3/147 345/173
2015/0040211 A1* 2/2015 Lee ....................... G06F 1/1626 726/16
2015/0186092 A1* 7/2015 Francis ................. G06F 3/1423 345/520

FOREIGN PATENT DOCUMENTS

| | | | |
|---|---|---|---|
| JP | 2002-149616 | A | 5/2002 |
| JP | 2010-181556 | A | 8/2010 |
| JP | 2012-003457 | A | 1/2012 |
| JP | 2012-008290 | A | 1/2012 |
| JP | 2012-058901 | A | 3/2012 |
| JP | 2013-025567 | A | 2/2013 |
| JP | 2013-134532 | A | 7/2013 |
| JP | 2013-2006614 | A | 10/2013 |

* cited by examiner

200

B STEPS

5267 STEPS

1201

200

C SPEED 6.2 Km/h

1202

APPARATUS, SYSTEM, METHOD FOR DESIGNATING DISPLAYED ITEMS AND FOR CONTROLLING OPERATION BY DETECTING MOVEMENT

CROSS-REFERENCE TO RELATED APPLICATION

The present application is based upon and claims the benefit of priority from the prior Japanese Patent Application No. 2014-006719, filed Jan. 17, 2014, and the prior Japanese Patent Application No. 2014-227687, filed Nov. 10, 2014, the entire contents of which are incorporated herein by reference.

BACKGROUND OF THE INVENTION

1. Field of the Invention

The present invention relates to an electronic apparatus, a system, and a method for displaying plural items for giving instructions of performing different operations respectively, and a computer readable storage medium with a program stored therein.

2. Description of the Related Art

In electronic apparatuses of recent years, such as smartphones, tablet terminals, some digital cameras, wrist terminal apparatuses, and glasses type terminal apparatuses, plural icons are indicated on the displaying device and, when the icon is touched or flicked by a user or operated by the user's eyes, a program corresponding to the operated icon is executed. But in these electronic apparatuses, the icons correspond to their own programs and, even if the icon is designated, the program corresponding to such designated icon starts only.

For making the electronic apparatus realize more complicated operations, a technique of swinging the electronic apparatus has been proposed in addition to the touching operation. Japanese Unexamined Patent Publication No. 2002-149616 has disclosed a mobile terminal, which is provided with a touch panel and an acceleration sensor. In the mobile terminal, the acceleration sensor detects movement, acceleration and/or inclination of the mobile terminal itself, thereby controlling an image (contents) displayed thereon. Movement of icons displayed on its display unit is controlled depending on an inclination angle at which the mobile terminal is held. When the mobile terminal is held horizontally, a content of the icon displayed approximately in the vicinity of the center of the displaying unit is displayed on the display unit. Therefore, the user moves the mobile terminal in all directions and, when his/her desired icon is displayed in the vicinity of the center of the displaying unit, the user holds the mobile terminal horizontally to search or browse for information.

Meanwhile, Japanese Unexamined Patent Publication No. 2010-181556 has proposed an image displaying apparatus having an acceleration sensor. The image displaying apparatus changes indication on the displaying unit, only when the acceleration sensor has detected that a user inclines the image displaying apparatus while he/she is operating the apparatus. In other words, only when the user inclines the apparatus while operating a malfunction-prevention button, a first image of a person is changed to a second image of the person.

The present invention provides an apparatus which will realize plural operations in response to movement of the apparatus.

SUMMARY OF THE INVENTION

According to one aspect of the invention, there is provided an electronic apparatus which comprises a displaying unit for displaying plural items, the items prepared for giving instructions of performing different operations respectively, a detecting unit for detecting movement, and, a controlling unit for, when an item is designated from among the plural items, performing operation corresponding to the designated item, and for, on the assumption that any of the plural items is designated on the displaying unit and the detecting unit detects movement, changing an indication of the designated item or an indication relating to designated item on the displaying unit, and for, on the assumption that other item is designated on the displaying unit and the detecting unit detects movement, changing an indication of the designated other item or an indication relating to designated other item on the displaying unit.

According to another aspect of the invention, there is provided an electronic apparatus which comprises comprising a displaying unit which displays plural items, the plural items giving instructions of performing different operations respectively, and a detecting unit which detects a user's line of sight, wherein, on the assumption that any of the plural items is designated on the displaying unit and the detecting unit detects movement of the user's line of sight, an indication of the designated item or an indication relating to designated item is changed on the displaying unit.

According to other aspect of the invention, there is provided an electronic apparatus which comprises a displaying unit which has a first detecting unit for detecting a touching operation, and which displays plural items a second detecting unit which detects variation in a state of the body of the electronic apparatus provided with the displaying unit, and a controlling unit which, on the assumption that both the first detecting unit and the second detecting unit have detected that any of the plural items has been touched on the displaying unit and variation has occurred in the state of the body of the electronic apparatus, changes an indication of the touched item on the displaying unit.

According to still another aspect of the invention, there is provided a system including a displaying unit for displaying plural items and a detecting unit for detecting movement, wherein the items give instructions of performing different operations respectively and, when an item is designated from among the plural items, an operation corresponding to the designated item is performed, the system which comprises a controlling unit which, on the assumption that any of the plural items is designated on the displaying unit and the detecting unit detects movement, changes the operation corresponding to the designated item and, on the assumption that other item is designated on the displaying unit and the detecting unit detects movement, changes the operation of the designated other item.

According to still other aspect of the invention, there is provided a method performed in an electronic apparatus, wherein the electronic apparatus is provided with a displaying unit for displaying plural items and a detecting unit for detecting movement, and the items give instructions of performing different operations respectively and, when an item is designated from among the plural items, an operation corresponding to the designated item is performed, the method which comprises a step of changing an indication of a designated item or an indication relating to the designated item on the displaying unit, on the assumption that any of the plural items is designated on the displaying unit and the detecting unit detects movement, and a step of changing an indication of a designated other item or an indication relating to the designated other item on the displaying unit, on the assumption that other item is designated on the displaying unit and the detecting unit detects movement.

According to yet another aspect of the invention, there is provided a method performed in an electronic apparatus, wherein the electronic apparatus is provided with a displaying unit for displaying plural items and a detecting unit for detecting movement, and the items give instructions of performing different operations respectively, and when an item is designated from among the plural items, an operation corresponding to the designated item is performed, the method which comprises a step of switching to a mode relating to a designated item, on the assumption that any of the plural items is designated on the displaying unit and the detecting unit detects movement, and a step of switching to a mode relating to a designated other item, on the assumption that the other item is designated on the displaying unit and the detecting unit detects movement.

According to yet other aspect of the invention, there is provided a non-transitory computer-readable storage medium with an executable program stored thereon, wherein a computer is mounted on an electronic apparatus having a displaying unit, and the displaying unit displays plural items, and the plural items give instructions of performing different operations, respectively, and the program instructs the computer to function as the following units:

a detecting unit which detects movement, a designating unit which designates an item from among the plural items, a performing unit which, when an item has been designated by the designating unit, performs an operation corresponding to the designated item, and a controlling unit which, on the assumption that the designating unit designates any of the plural items and the detecting unit detects movement, changes an indication of the designated item or an indication relating to designated item on the displaying unit and, on the assumption that the designating unit designates other item and the detecting unit detects movement, changes an indication of the designated other item or an indication relating to designated other item on the displaying unit.

DETAILED DESCRIPTION OF THE PREFERRED EMBODIMENTS

Figure 1A:
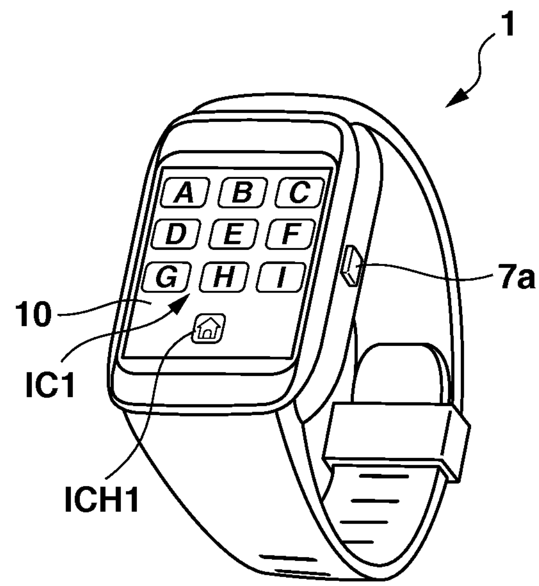
FIG. 1A is a view schematically showing a wrist type terminal apparatus according to the first embodiment of the invention.

FIG. 1A is a view schematically showing the first embodiment of the invention. In FIG. 1A, a wrist type terminal apparatus 1 is shown, which is worn on a wrist of a user. On a displaying unit 10 are displayed plural icons IC1 denoted by "A" to "I". An icon ICH1 is a home button. An operation switch is denoted by 7*a*.

Figure 1B:
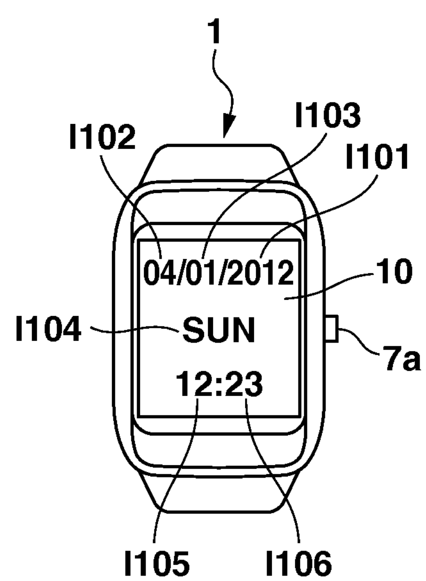
FIG. 1B is a view showing an example of another indication displayed on a displaying unit of the wrist type terminal apparatus according to the first embodiment of the invention.

FIG. 1B is a view showing an example of another indication displayed on the displaying unit 10 of the wrist type terminal apparatus 1 according to the first embodiment of the invention. The wrist type terminal apparatus 1 has various functions (modes). For instance, if the icon "A" represents a watch mode and the user touches the icon "A", the wrist type terminal apparatus 1 will operate as a wrist watch. In the watch mode shown in FIG. 1B, the wrist type terminal apparatus 1 indicates an item (month item) I102 representing "month", and an item (day item) I103 representing "day" in the uppermost line, an item (year item) I101 representing "year", an item (day-of-week item) I104 representing "day of the week" in the middle line, and an item (hour item) I105 representing "hour" and an item (minute item) I106 representing "minute" (12:23) in the bottom line on the displaying unit 10.

Figure 2A:
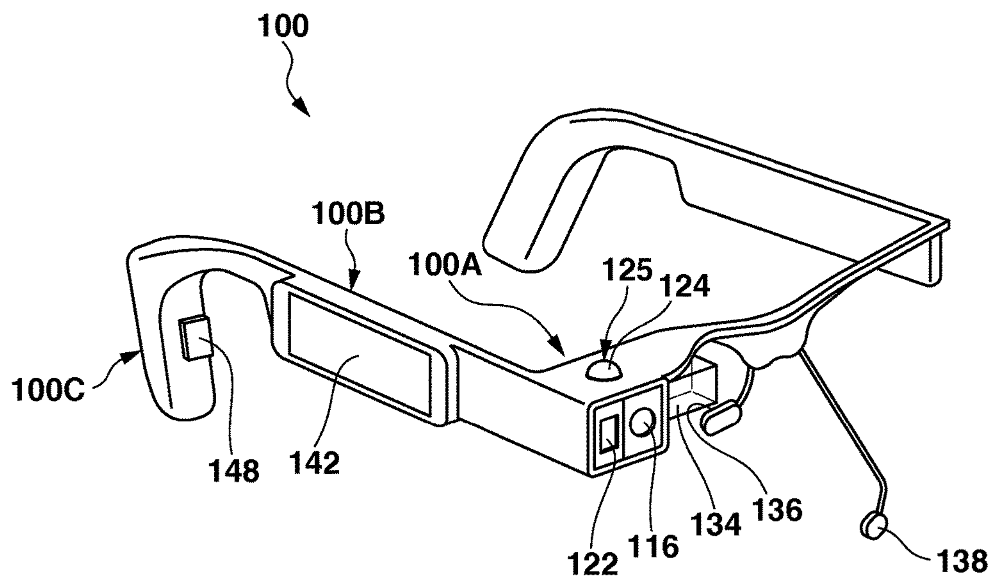
FIG. 2A is a view schematically showing a glasses-type information apparatus according to the second embodiment of the invention.
Figure 2B:
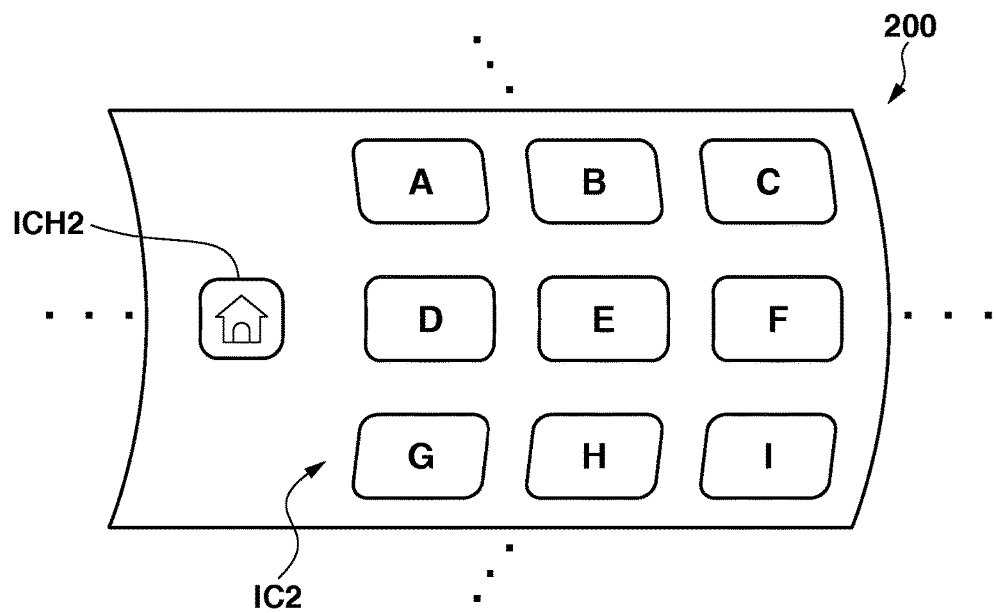
FIG. 2B is a view showing an imaginary screen with icons displayed thereon in the second embodiment of the invention.

FIG. 2A is a view schematically showing the second embodiment of the invention. In FIG. 2A, a glasses-type information apparatus 100 is shown, whose detailed structure will be described later. FIG. 2B is a view showing an imaginary screen 200 in the second embodiment of the invention, on which screen icons IC2 are indicated. An icon ICH2 is a home button.

Figure 3A:
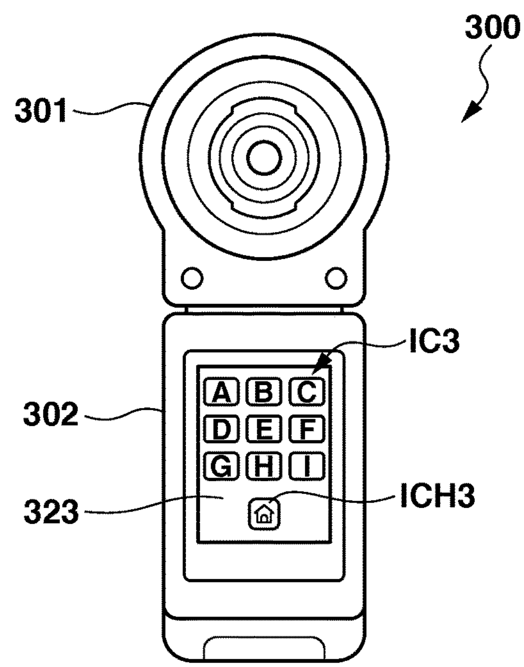
FIG. 3A is a view schematically showing a camera system according to the third embodiment of the invention.
Figure 3B:
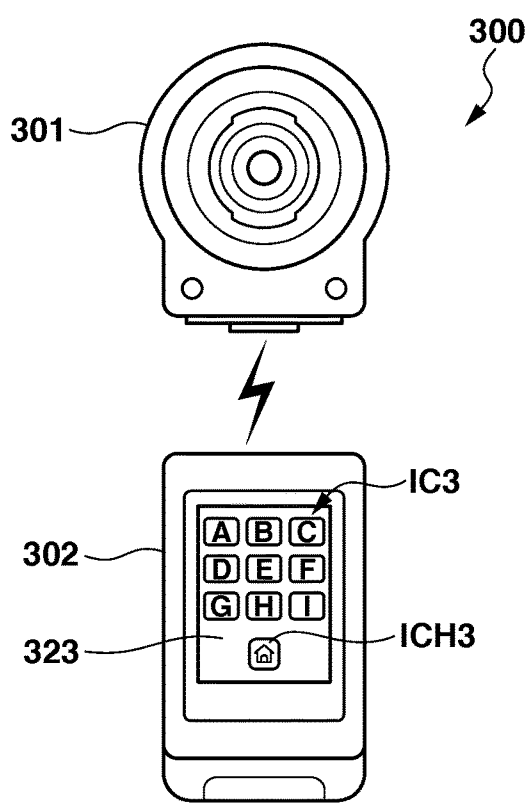
FIG. 3B is a view showing the camera system with an imaging unit and a monitor unit separated from each other.

FIG. 3A is a view schematically showing the third embodiment of the invention. In FIG. 3A, a camera system 300 is shown, which consists of an imaging unit 301 and a monitor unit 302. The imaging unit 301 and the monitor unit 302 can be physically separated as shown in FIG. 3B but can be connected by means of a wireless communication such as Bluetooth (Registered trademark) when they are separated. Icons IC3 are indicated on a displaying unit 323 of the monitor unit 302. An icon IC3 is a home button.

The plural embodiments of the invention will be described with reference to the accompanying drawings in detail. In the following description, the term "item(s)" includes the icon(s), all electronic indications for designating prescribed operations, and also includes operation menus. More particularly, IC1, IC2 and IC3 shown in FIG. 1A, FIG. 2B, FIG. 3A and FIG. 3B are items. When one item contains plural menus, indications corresponding respectively to the plural menus are also denoted as items. For example, indications representing a calendar function are denoted as items, and the indications representing "year", "month", and "day" in the calendar function respectively are also items. Numerals denoted by I101 to I106 shown in FIG. 1B are items, too.

First Embodiment of the Invention

The wrist type terminal apparatus according to the first embodiment of the invention will be described.

<Circuit Configuration>

Figure 4:
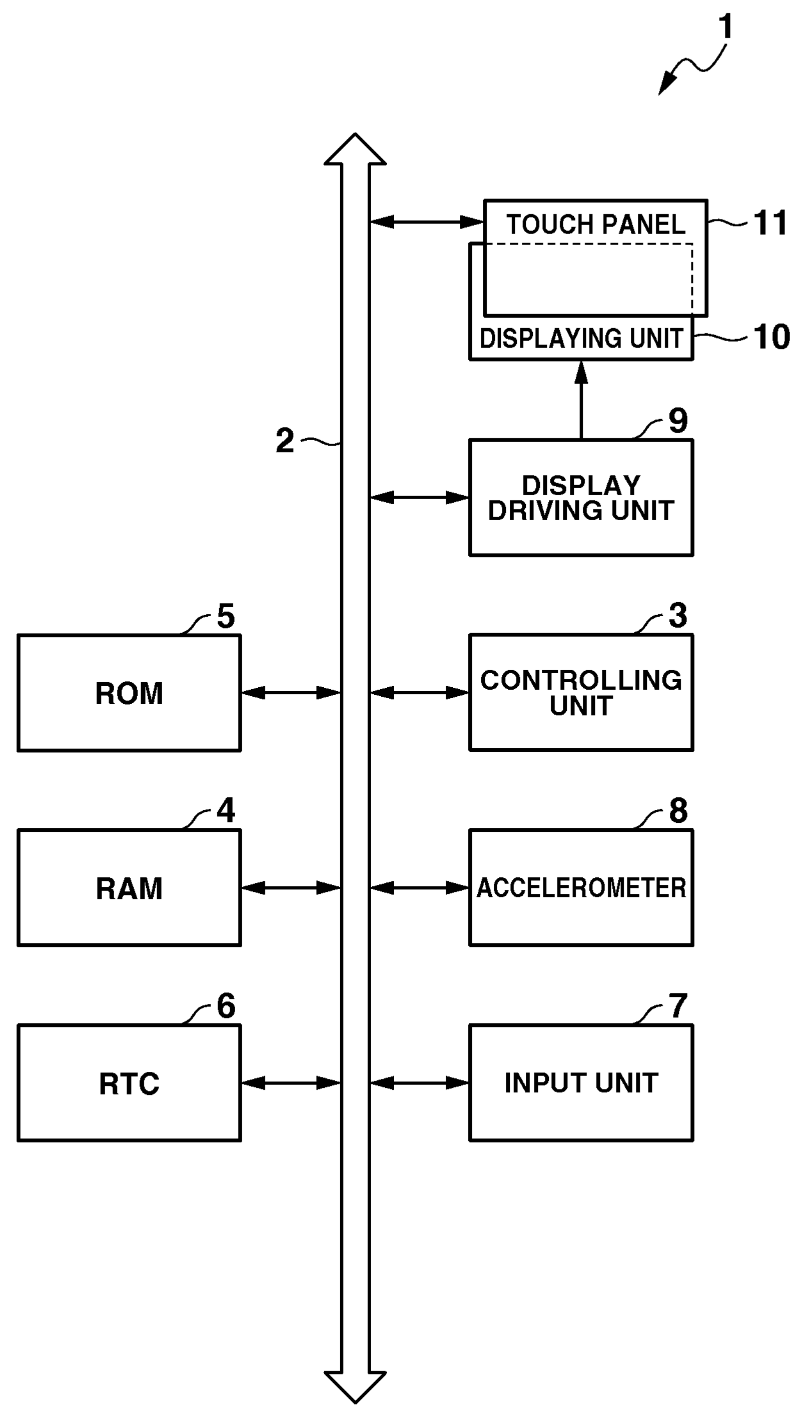
FIG. 4 is a block diagram of a circuit configuration of the wrist type terminal apparatus according to the first embodiment of the invention.

FIG. 4 is a block diagram of a circuit configuration of the wrist type terminal apparatus 1 according to the first embodiment of the invention. As shown in FIG. 4, the wrist type terminal apparatus 1 comprises a controlling unit 3, RAM (Random Access Memory) 4, ROM (Read Only Memory) 5, RTC (Real Time Clock) 6, an input unit 7, an accelerometer 8, a display driving unit 9, a displaying unit 10, and a touch panel 11. These elements are connected to each other through a bus 2.

Further, the controlling unit 3 consists of CPU (Central Processing Unit) and its peripheral circuit. CPU uses RAM 4 as its own work memory. CPU executes a program previously stored in ROM 5 to carry out an arithmetic operation and a process on data supplied from peripheral apparatuses through the bus 2, and further to control the whole operation of the wrist type terminal apparatus 1. The result of the arithmetic operation by the controlling unit 3 is output to the displaying unit 10 via the display driving unit 9, allowing the user to view an image of the result and prompting the user the following operation.

In general, the displaying unit 10 consists of a liquid displaying device with a touch panel 11 laminating thereon. The user is allowed to enter and/or give various sorts of data and instructions to the controlling unit 3 by touching an icon and/or item indicated on the displaying unit 10 (touch panel 11) without operating keys. As the touch panel 11 can be employed various types of touch panels, such an electrostatic capacitance type touch panel, a resistive film type touch panel, and a surface elastic wave type touch panel.

It is preferable to compose the accelerometer 8 with a tri-axial acceleration sensor. The accelerometer 8 comprises an acceleration sensor (not shown) for detecting accelerations of the body of the wrist type terminal apparatus 1 (FIG. 1A) in three directions, an amplifier (not shown) for amplifying signals output from the acceleration sensor, and A/D convertor (not shown) for converting the amplified signal into a digital signal. The controlling unit 3 can calculate an inclined angle and accelerations of the body of the wrist type terminal apparatus 1 based on the digital signal output from the accelerometer 8.

RTC (Real Time Clock) 6 has a function of counting the current time and a calendar function. RTC 6 supplies current-date information and current-time information to the controlling unit 3 through the bus 2. Then, the controlling unit 3 serves to indicate "date", "day of the week", and "time" on the displaying unit 10 of the wrist type terminal apparatus 1 in a calendar mode, as shown in FIG. 1B.

The input unit 7 is used by the user when he/she operates the wrist type terminal apparatus 1 on his/her wrist. The input unit 7 comprises plural operation switches such as a mode setting switch and a power switch. In FIG. 1A and FIG. 1B, one operation switch, an operation switch 7*a*, is displayed on behalf of the plural operation switches. States where the plural switches have been operated are successively detected by the controlling unit 3.

The display driving unit 9 comprises a driver circuit for driving the displaying circuit 10. Receiving an instruction sent from the controlling unit 3 through the bus 2, the display driving unit 9 drives the displaying unit 10 to indicate the date, the current time, and various sorts of information.

<Operation of Wrist Type Terminal Apparatus>

Figure 5:
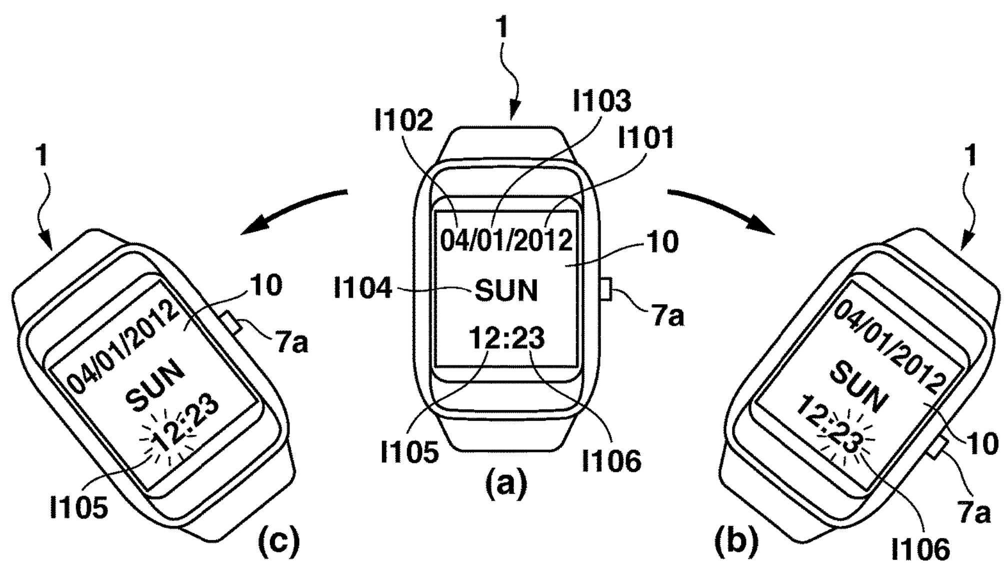
FIG. 5 is a view showing the wrist type terminal apparatus in a calendar mode.
Figure 7:
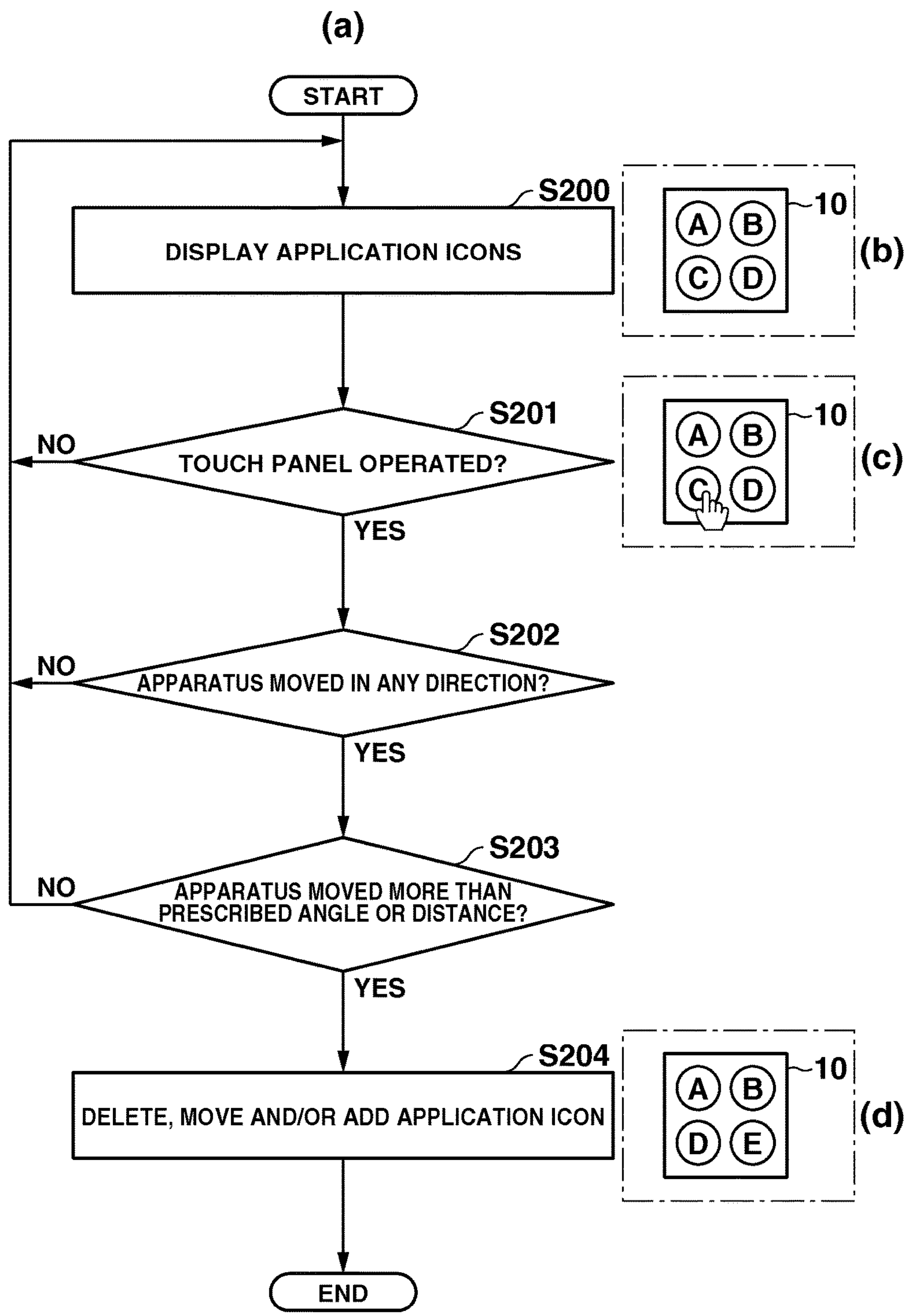
FIG. 7 is a flow chart showing a process of deleting an icon or item, together with icons representing application programs.

The operation of the wrist type terminal apparatus 1 will be described with reference to FIG. 5. FIG. 5 is a view showing the wrist type terminal apparatus 1 in the calendar mode. (a) in FIG. 7 shows a flow chart, (b) in FIG. 7 shows the example of a display of the displaying unit 10 in Step S200, (c) in FIG. 7 shows the example of a display of the display unit 10 in Step S201, and (d) in FIG. 7 shows the example of a display of the display unit 10 in Step S204. It is presumed that the wrist type terminal apparatus 1 is held initially at a position (a) shown in FIG. 5. As shown in FIG. 5, in the top line on the displaying unit 10, the year item I101, the month item I102, and the day item I103 are indicated, in the middle line the day-of-week item I104 is indicated, and in the bottom line the hour item I105 and the minute item I106 (12:23) are indicated.

Figure 6:
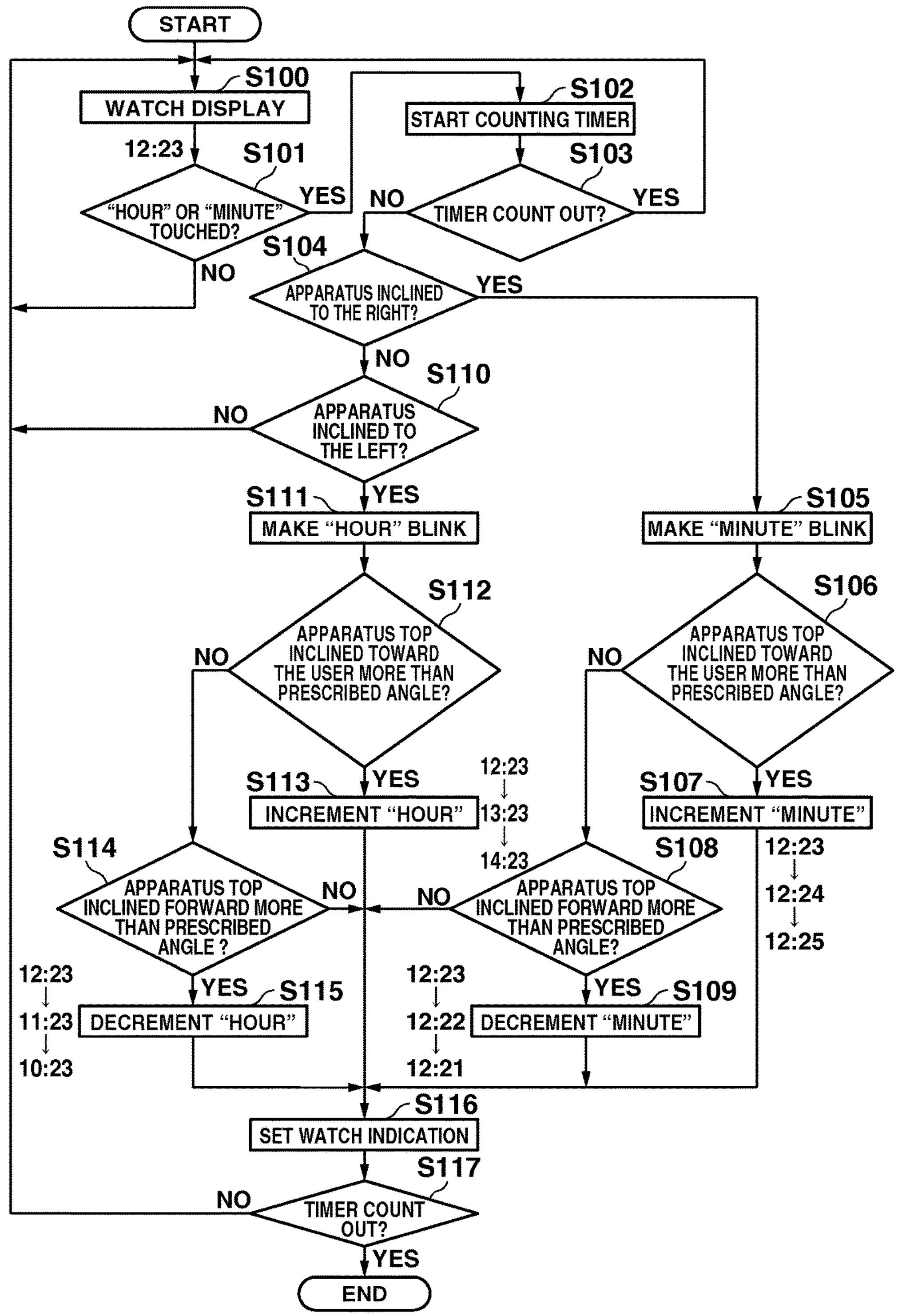
FIG. 6 is a flow chart of a process performed in the wrist type terminal apparatus according to the first embodiment of the invention.

When the user touches the hour item I105 or the minute item I106 with these items indicated on the displaying unit 10, the operation of the wrist type terminal apparatus 1 will start in accordance with the program (process) shown in FIG. 6. At first, a watch indication of (12:23) is displayed in the bottom line on the displaying unit 10 at a watch display (step S100).

When the touch panel 11 has been scanned, the controlling unit 3 judges whether the hour item I105 or the minute item I106 has been touched (step S101). When it is determined that none of the items has been touched (NO at step S101), the controlling unit 3 returns to step S100 and continues displaying the same watch indication (12:23).

When it is determined that either the hour item I105 or the minute item I106 has been touched (YES at step S101), the controlling unit 3 makes a timer start a timer-counting (step S102). The timer-counting is a process for counting a time in which the wrist type terminal apparatus 1 is moved, that is, a process for designating a time period, for instance, of 5 seconds. Further, the controlling unit 3 judges whether the timer has counted out, in other words, the controlling unit 3 judges whether the timer has counted the designated time period, that is, whether the designated time period has lapsed (step S103). When it is determined that the designated time period has lapsed while no movement of the wrist type terminal apparatus 1 is detected (YES at step S103), the controlling unit 3 returns to step S100 and displays the watch indication. When it is determined that the designated time period has not lapsed (NO at step S103), then the controlling unit 3 advances to step S104.

The controlling unit 3 judges whether the body of the wrist type terminal apparatus 1 has been inclined to the right (step S104). When it is determined that the body of the wrist type terminal apparatus 1 has been inclined to the right (a position (b) shown in FIG. 5) (YES at step S104), the controlling unit 3 determines that an instruction of changing the minute item I106 has been given and makes the minute item I106 ("23") blink on the displaying unit 10 and enters into a correction mode (step S105).

Then, the controlling unit 3 judges whether the body of the wrist type terminal apparatus 1 has been inclined toward the user (that is, to the user's side) more than a prescribed angle (step S106). More particularly, when the top of the wrist type terminal apparatus 1 has been inclined toward the user more than the prescribed angle, for instance, more than 30 degrees, from the initial position (YES at step S106), the controlling unit 3 keeps incrementing the minute item I106 (step S107), whereby the minute item I106 changes as follows: "23→24→25". When the body of the wrist type terminal apparatus 1 has returned to the original position, the controlling unit 3 ceases incrementing the minute item I106, setting the minute item I106 to "25" to be indicated.

When it is determined that the body of the wrist type terminal apparatus 1 has not been inclined toward the user more than the prescribed angle (NO at step S106), the controlling unit 3 advances to step S108 and judges whether the body of the wrist type terminal apparatus 1 has been inclined forward (that is, to the opposite side) more than a prescribed angle. More particularly, when the top of the wrist type terminal apparatus 1 has been inclined forward more than the prescribed angle, for instance, more than 30 degrees, from the initial position (YES at step S108), the controlling unit 3 keeps decrementing the minute item I106 (step S107), whereby the minute item I106 changes as follows: "23→22→21". When the body of the wrist type terminal apparatus 1 has returned to the original position, the controlling unit 3 ceases decrementing the minute item I106, setting the minute item I106 to "21" to be indicated.

Meanwhile, when it is determined that the body of the wrist type terminal apparatus 1 has not been inclined to the right (NO at step S104), the controlling unit 3 advances to step S110, and judges whether the body of the wrist type terminal apparatus 1 has been inclined to the left (a position (c) shown in FIG. 5). When it is determined that the body of the wrist type terminal apparatus 1 has been inclined to the left (YES at step S110), the controlling unit 3 determines that an instruction of changing the hour item I105 has been given and makes the hour item I105 ("12") blink on the displaying unit 10 and enters into the correction mode (step S111).

The controlling unit 3 advances to step S112 to judge whether the body of the wrist type terminal apparatus 1 has been inclined toward the user more than the prescribed angle. More particularly, when the top of the wrist type terminal apparatus 1 has been inclined toward the user more than the prescribed angle, for instance, more than 30 degrees, from the initial position (YES at step S110), the controlling unit 3 keeps incrementing the hour item I105 (step S113), whereby the hour item I105 changes as follows: "12→13→14". When the body of the wrist type terminal apparatus 1 has returned to the original position, the controlling unit 3 ceases incrementing the hour item I105, setting the hour item I105 to "14" to be indicated.

When it is determined that the body of the wrist type terminal apparatus 1 has not been inclined toward the user more than the prescribed angle (NO at step S112), the controlling unit 3 advances to step S114 and judges whether the body of the wrist type terminal apparatus 1 has been inclined forward more than a prescribed angle. More particularly, when the top of the wrist type terminal apparatus 1 has been inclined forward more than the prescribed angle, for instance, more than 30 degrees, from the initial position (YES at step S114), the controlling unit 3 keeps decrementing the hour item I105 (step S115), whereby the hour item I105 changes as follows: "12→11→10". When the body of the wrist type terminal apparatus 1 has returned to the original position, the controlling unit 3 ceases decrementing the hour item I105, setting the hour item I105 to "10" to be indicated.

As described above, having set the hour item I105 and the minute item I106, the controlling unit 3 finishes the watch setting operation (step S116), whereby the hour item I105 has been set to "10" to be indicated. When the timer has counted the designated time period, that is, when the designated time period has lapsed (YES at step S117), the program finishes.

As described above, the user can correct "hour" and/or "minute" indicated on the wrist type terminal apparatus 1 by inclining the body of the apparatus 1 while touching the hour item I105 and/or the minute item I106 indicated thereon. Returning the body of the wrist type terminal apparatus 1 to the original position, the correcting or setting operation can be completed. The rate of incrementing or decrementing data can be changed depending on the inclined angle of the body of the wrist type terminal apparatus 1. The year item I101, the month item I102, and the day item I103 will be processed in a similar manner.

The wrist type terminal apparatus 1 is illustrated in FIG. 5, whose top is inclined to the right and to the left with its center portion held approximately at the center. It will be possible to turn the body of the terminal apparatus 1 about its imaginary vertical axis passing through the center of said terminal apparatus 1 instead of inclining the body of the apparatus 1 to the right or to the left. Also, it will be possible to turn the body of the terminal apparatus 1 about its imaginary horizontal axis passing through the center of said apparatus 1 instead of inclining the top of the terminal apparatus 1 toward the user or forward.

In the wrist type terminal apparatus 1 according to the present embodiment of the invention, the items located on the right or left in the displaying unit 10 are selected depending on the terminal apparatus 1 inclined to the right or the left, and incrementing or decrementing data is performed depending on whether the terminal apparatus 1 is inclined toward the user or forward. But it will be possible to select the items on the displaying unit 10 depending on whether the terminal apparatus 1 is inclined toward the user or forward, and to increment or decrement data depending on the terminal apparatus 1 inclined to the right or the left.

In the wrist type terminal apparatus 1 according to the present embodiment of the invention, while the body of the terminal apparatus 1 is held inclined more than the prescribed angle, data is been incremented or decremented. But an arrangement will be possible, such that data is incremented or decremented when the terminal apparatus 1 is swung once forward or rearward or to the right or the left more than prescribed acceleration.

In the wrist type terminal apparatus 1 according to the present embodiment of the invention, the movement of the terminal apparatus 1 is detected during a prescribed time period after the hour item I105 and/or the minute item I106 is touched, and data is incremented or decremented depending on the direction or the distance of the movement of the terminal apparatus 1. It will be possible to change the indication ("hour" or "minute") on the displaying unit 10 only in response to movement of the terminal apparatus 1 detected while the hour item I105 and/or the minute item I106 is touched by the user. This arrangement will prevent the wrist type terminal apparatus 1 from operating incorrectly.

In the above description, the invention has been described, which is applied to change the indication of the hour item I105 and the minute item I106. It is possible to apply the present invention for changing the month item I102, the day item I103, and the year item I101 indicated in the uppermost line on the displaying unit 10. More specifically, the user inclines the wrist type terminal apparatus 1 to the right or to the left to select one item indicated on the displaying unit 10 while touching the item that he/she wants to change, and then inclines the terminal apparatus 1 forward or toward the user to change the indication ("month", "day", and "year") on the displaying unit 10.

When the user inclines the body of the wrist type terminal apparatus 1 forward or toward himself or herself, while touching an icon (not shown) and/or an operation switch 7*a*, the item(s) in the uppermost line, the item(s) in the middle line, and the item(s) in the bottom line (shown in FIG. 5) can be selected successively.

Further, it will be possible to change the indication on the displaying unit 10 by inclining the terminal apparatus 1 little by little as described below.

In the case that the item is time data such as "day", "hour", "minute", and "second". When the user inclines the body of the wrist type terminal apparatus 1 forward a little, while touching the minute item, data of "minute" is incremented by 1 minute. When the user inclines the body of the wrist type terminal apparatus 1 a little toward the user, while touching the minute item, data of "minute" is decremented by 1 minute. When the user inclines the body of the wrist type terminal apparatus 1 forward substantially, while touching the hour item, data of "hour" is incremented by 1 hour. When the user inclines the body of the wrist type terminal apparatus 1 substantially toward the user, while touching the hour item, data of "hour" is decremented by 1 hour.

In the case that the item is a watch (schedule). When the user inclines the body of the wrist type terminal apparatus 1 forward a little while touching the item of "watch", data of "minute" is incremented by 1 minute. When the user inclines the body of the wrist type terminal apparatus 1 a little toward the user, while touching the item of "watch", data of "minute" is decremented by 1 minute. When the user inclines the body of the wrist type terminal apparatus 1 forward substantially, while touching the item of "watch", data of "hour" is incremented by 1 hour. When the user inclines the body of the wrist type terminal apparatus 1 substantially toward the user, while touching the item of "watch", data of "hour" is decremented by 1 hour.

Modification of First Embodiment

A modification of the first embodiment of the invention will be described with reference to FIG. 7. In the modification of the first embodiment, like reference numerals represent like units or like elements of the first embodiment and a further description thereof will be omitted.

FIG. 7 is a flow chart showing a method of deleting an icon or item, together with icons representing application programs. The four icons "A", "B", "C" and "D" representing application programs are indicated on the displaying unit 10 of the wrist type terminal apparatus 1 as shown in FIG. 7 at (b) (Application-program displaying step S200).

The controlling unit 3 judges whether the touch panel 11 has been touched by the user (step S201). When it is determined that the touch panel 11 has been touched (refer to (c) in FIG. 7) (YES at step S201), the controlling unit 3 advances to step S202 and judges whether the wrist type terminal apparatus 1 has been moved in any direction. When it is determined that the wrist type terminal apparatus 1 has not been moved in any direction (NO at step S202), then the controlling unit 3 returns to the application-program displaying step S200 (refer to (b) in FIG. 7).

When it is determined that the wrist type terminal apparatus 1 has been moved in some direction (YES at step S202), the controlling unit 3 advances to step S203 and judges whether the wrist type terminal apparatus 1 has been moved more than prescribed distance or at an acceleration rate more than a prescribed rate. The judgment will be made in a similar manner to in the first embodiment. When it is determined YES at step S203, the controlling unit 3 advances to step S204 and deletes the touched icon "C" from the displaying unit 10 and moves the icon "D" to the position of the deleted icon "C". Further, the controlling unit 3 adds a new icon "E" to the empty position (step S204). As a result, the icons "A", "B", "D", and "E" are indicated on the displaying unit 10, as shown at (d) in FIG. 7. When it is determined that the wrist type terminal apparatus 1 has not been moved more than prescribed distance or at an acceleration rate more than a prescribed rate (NO at step S203), the controlling unit 3 returns to step S200 and displays the original application-program indication (refer to (b) in FIG. 7).

In the above described method, the touched icon "C" is deleted from the displaying unit 10 in accordance with movement of the wrist type terminal apparatus 1. But it will be possible to delete the icons "A", "B", and "D" other than the touched icon "C" in accordance with movement of the wrist type terminal apparatus 1. In deleting these icons, it is possible to move the icon downward in the displaying unit 10 to erase it.

In the above description, the present invention has been described with reference to the wrist type terminal apparatus, but the present invention can be used not only in the wrist type terminal apparatuses as described above, but also in various terminal apparatuses as far as they are provided with a displaying unit, a touch sensor panel, and a detecting unit for detecting movement of the terminal apparatus, for example, such as smartphones, personal digital assistants (PDA), tablet terminals, electronic dictionaries, digital books, digital cameras, game machines, and the like.

The wrist type terminal apparatus 1 described in the above description is used alone, but can be used as one of a pair of terminal apparatuses which can data-communicate with other device such as a smartphone. Such terminal apparatus has various functions such as Wi-Fi connection ON/OFF function, Flight mode ON/OFF function, and Wall-paper/Standby picture selecting function. The user can switch Wi-Fi connection ON/OFF function, Flight mode ON/OFF function, and Wall-paper/Standby picture selecting function by inclining the body of the wrist type terminal apparatus 1 while touching an icon representing the function. Plural pictures can be successively displayed in order of photographing dates, titles, and/or photographing places, when the wrist type terminal apparatus 1 is inclined while an appropriate icon representing a holder of wall-papers, standby pictures, and other pictures is touched.

As will be described as other embodiment of the invention later, in a wearable terminal apparatus, such as a glasses-type wearable terminal apparatus and a head mount terminal apparatus, it is possible for the user to operate a specific image area in an image displayed on a displaying unit by moving his/her line of sight, and then to adjust an image within the specific image area by moving or swinging his/her head to the right or to the left, or forward or rearward. When using this type of wearable terminal apparatus, the user often cannot use his/her both hands freely to operate the terminal apparatus, and therefore it is advantageous in adjusting an image that the image is adjusted in response to movement of the terminal apparatus, which movement synchronizes with the user's movement.

Second Embodiment of the Invention

In the first embodiment of the invention, the invention is applied to the wrist type terminal apparatus. The embodiment of the invention will be described, in which the invention is applied to the glasses-type information apparatus.

<Circuit Configuration>

FIG. 2A is a view showing an external appearance of the glasses-type information apparatus 100 according to the second embodiment of the invention. The glasses-type information apparatus 100 is roughly composed of a main body 100A, bows 100B, and ear hangings 100C. The main body is provided with a camera unit 116, a sensor unit 122, GPS (Global Positioning System) 124, GPS antenna 125, a projection unit 134, a screen 136, and a microphone unit 138. The bow 100B is provided with an operation unit 142 consisting of a touch pad. The user can operate the operation unit 142 with the finger just like he/she operates a touch pad of a note personal computer and/or a touch panel of a smartphone. The ear hanging 100C is provided with an I/O unit 148, and includes CPU 110, a watch unit or a clock unit 126, a memory block 140, a controlling block 150 and a sight-line detecting unit 160 (these units are not shown in FIG. 3A).

Figure 8:
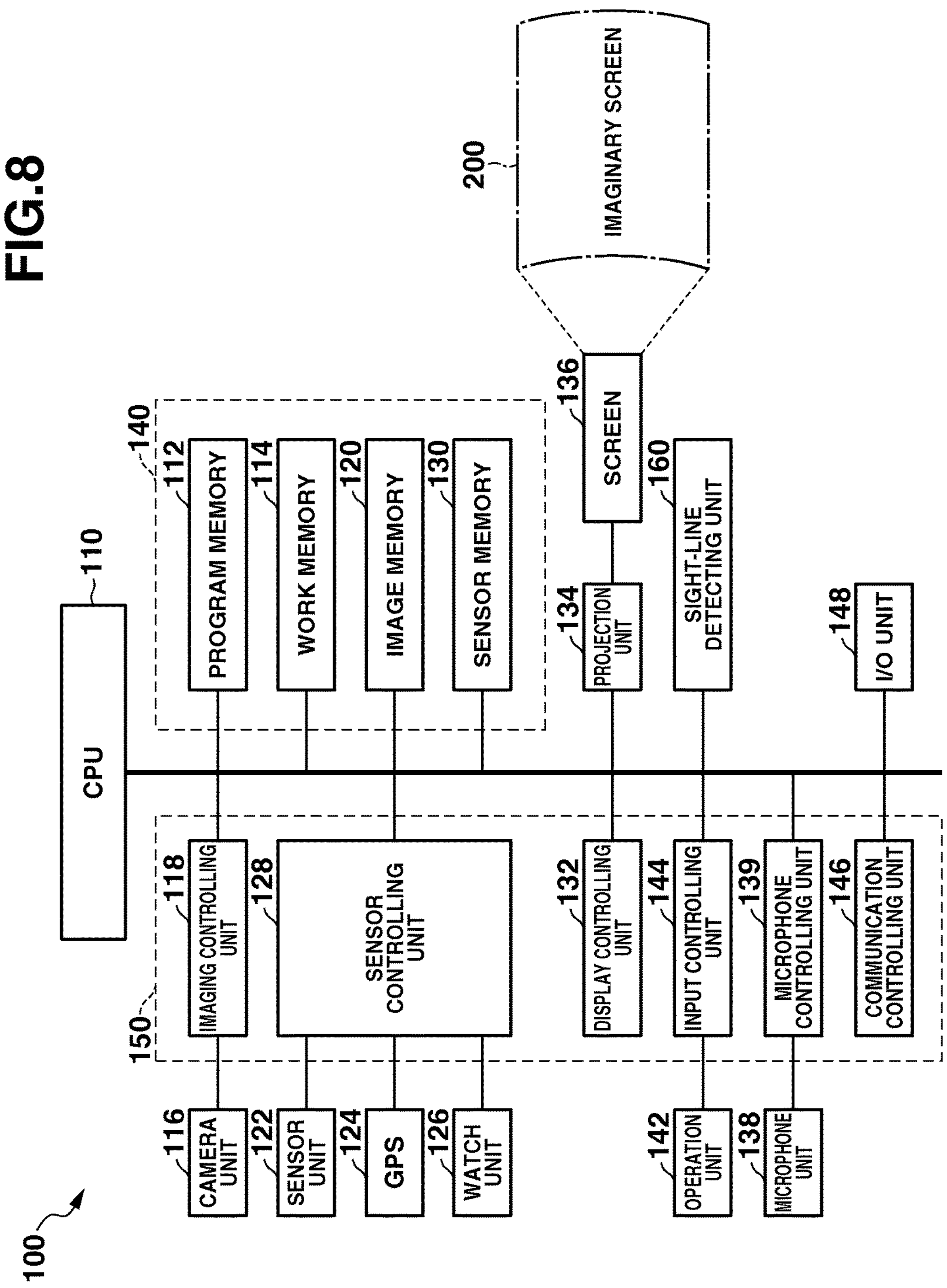
FIG. 8 is a block diagram of a circuit configuration of the glasses-type information apparatus according to the second embodiment of the invention.

FIG. 8 is a block diagram of a circuit configuration of the glasses-type information apparatus 100. CPU 110 reads a program stored in the program memory 112 and expands the program on a work memory 114 to execute said program, thereby controlling the whole operation of the glasses-type information apparatus 100. The program memory 112 stores OS and various application programs. A camera unit or an imaging unit 116 has an imaging device such as CCD and/or CMOS. The imaging unit 116 obtains and stores in an image memory 120 a still image and a moving image under control of an imaging controlling unit 118. A sensor unit 122 is provided with various sensors such as a tri-axial acceleration sensor, a vibration sensor, and a temperature sensor. The sensor unit 122 detects various states of the glasses-type information apparatus 100, including shaking and other movement of the apparatus 100. GPS 124 has a GPS antenna 125, and obtains position information. The watch unit 126 calculates a date, hour, minute, and second. A sensor controlling unit 128 controls operations of the sensor unit 122, GPS 124 and the watch unit 126, and collects various sorts of information. The collected various sorts of information is stored in a sensor memory 130.

A display controlling unit 132 makes the projection unit 134 project display data created by CPU 110 onto the screen 136. The screen 136 is disposed directly in front of the user's eye. Although an image projected on the screen 136 is small, the user is allowed to view an enlarged image on an imaginary screen 200, as conceptually illustrated in FIG. 2B.

A microphone unit 138 receives an audio sound, and a microphone controlling unit 139 controls operation of the microphone unit 138. An instruction depending on an audio sound can be entered through the microphone controlling unit 139. The operation unit 142 consists of the touch pad shown in FIG. 2A. An operation signal entered from the operation unit 142 is obtained by an input controlling unit 144. A communication controlling unit 146 can make a wireless connection with a smartphone and/or the Internet through Wi-Fi and/or Bluetooth (Trademark). The I/O unit 148 can make wire connection with USB cable and/or a memory card under control of the communication controlling unit 146.

A memory block 140 includes the program memory 112, the work memory 114, the image memory 120, and the sensor memory 130. A controlling block 150 includes the image controlling unit 118, the sensor controlling unit 128, the display controlling unit 132, the input controlling unit 144, the microphone controlling unit 139, and the communication controlling unit 146.

A sight-line detecting unit 160 serves to detect the user's line of sight. In other words, the sight-line detecting unit 160 detects a position in the imaginary screen 200 that the user is looking at. More specifically, the user's eye is photographed with an infrared camera to detect movement of the eye, thereby determining the position that the user is looking at. The user's line of sight is detected as follows: a portion (reference point) of the eye which does not move and a portion (moving point) of the eye which moves are detected, and the line of sight is detected based on the relative position of the moving point to the reference point. Since the technique of detecting the line of sight is well known, the detailed description thereof will not be given herein.

<Operation of Glasses-Type Information Apparatus>

When the user moves his/her body while wearing the glasses-type information apparatus 100, the sensor unit 122 and the sensor controlling unit 128 detects movement of the glasses-type information apparatus 100. In the case that the icon "B" represents "the number of steps", when the user walks while looking at the icon "B", then the sensor unit 122 and the sensor controlling unit 128 will detect the number of steps and indicate the item (step item) of "the number of steps" 1201, as displayed by example in FIG. 9A. By the way, when the user keeps looking at the icon "B" for 5 seconds, the mode will change to the display mode shown in FIG. 9A. While the user keeps looking at the icon "B" shown in FIG. 9A, the step item 1201 will be kept indicated. When the user should look at other position, the indication will return to a home image indication.

Figures 9A, 9B, 9C:
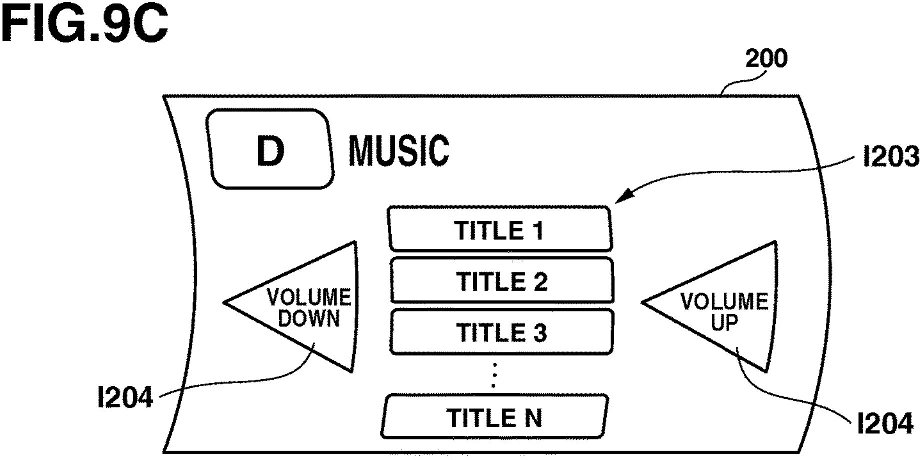
FIG. 9A is a view showing an icon "B" representing the number of steps, displayed on an imaginary screen in the second embodiment of the invention.
FIG. 9B is a view showing an icon "C" representing Km/h, displayed on an imaginary screen in the second embodiment of the invention.
FIG. 9C is a view showing an icon "D" representing music, displayed on an imaginary screen in the second embodiment of the invention.

If the icon "C" represents "Km/h" and the user jogs while looking at the icon "C", then the sensor unit 122 and the sensor controlling unit 128 will detect Km/h and indicate the item (Km/h item) of "Km/h" 1202, as displayed by example in FIG. 9B. By the way, when the user keeps looking at the icon "C" for 5 seconds, the mode will change to the display mode shown in FIG. 9B. While the user keeps looking at the icon "C" shown in FIG. 9B, the Km/h item 1202 will be kept indicated. When the user should look at other position, the indication will return to the home image indication.

If the icon "D" represents "MUSIC" and the user keeps looking at the icon "D", then the sight-line detecting unit 160 detects that the line of sight is looking at the icon "D" and the mode is switched to a music playback mode as shown in FIG. 9C. In the music playback mode, a title item 1203 representing music titles, title 1, title 2, title 3, . . . , title N is indicated. When the user moves his/her head up or down, the music title will be selected in response to the movement of the head.

A volume items 1204 are indicated on both sides of the title item 1203. When the user moves his/her head to the left, his/her movement is detected and the volume item 1204 on the left is selected and the volume is made down. When the user moves his/her head to the right, his/her movement is detected and the volume item 1204 on the right is selected and the volume is made up. It is possible to determine an order of selecting the music titles depending on whether the user moves his head to the left or to the right.

In the above description, the operations of the glasses-type information apparatus 100 have been described by example, and also it has been described that the icon can be designated depending on the movement of the user's line of sight and displaying of the mode and item can be changed in response to the result of the detection by the sensor. Accordingly, the user can obtain information of his/her body movement and change the mode of the apparatus, while he/she is taking exercise such as jogging.

Third Embodiment of the Invention

<Circuit Configuration>

Figure 10:
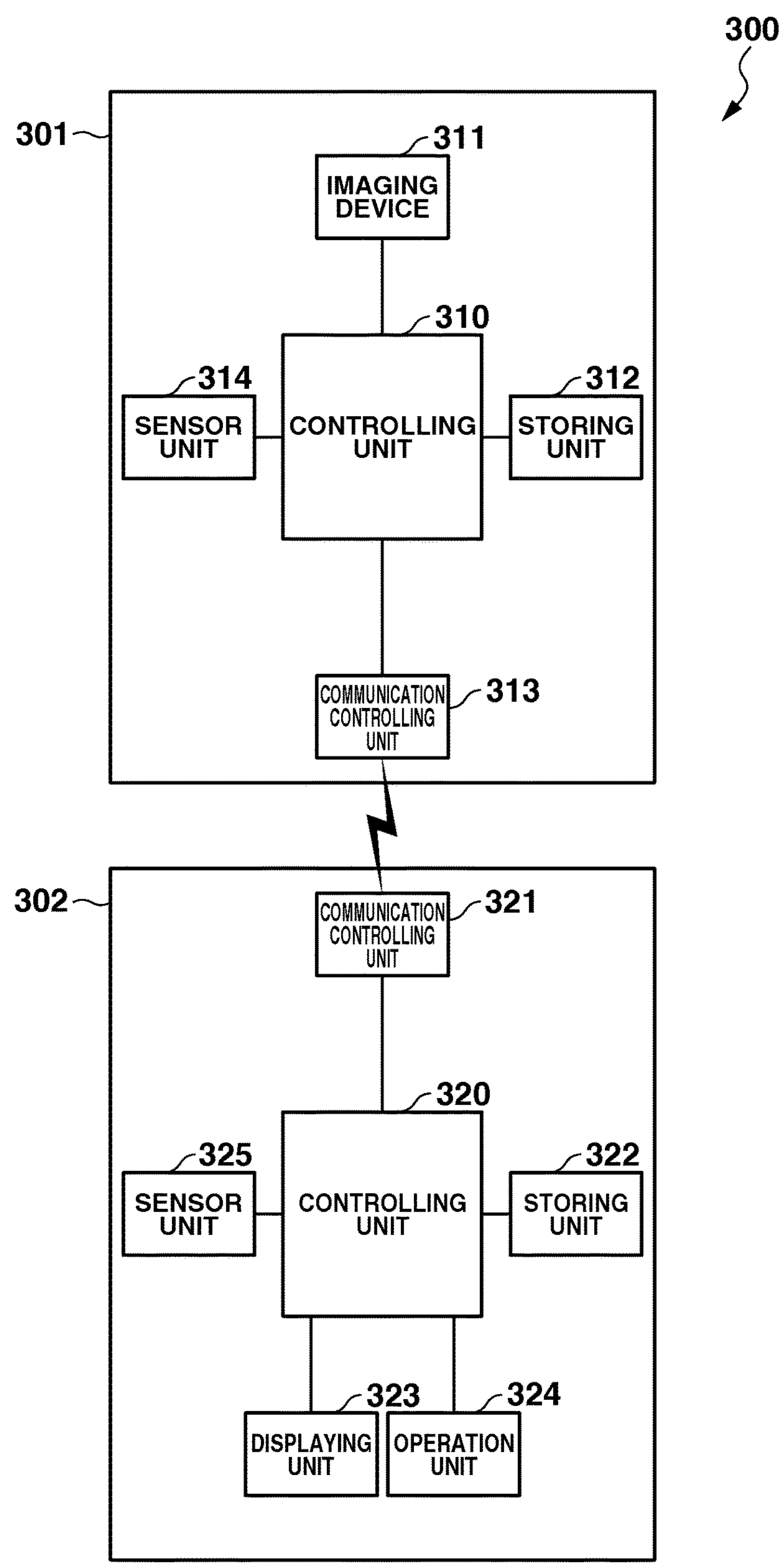
FIG. 10 is a block diagram schematically showing a configuration of the camera system according to the third embodiment of the invention.

FIG. 10 is a block diagram schematically showing a configuration of the camera system 300 according to the third embodiment of the invention. As described above, the camera system 300 consists of the imaging unit 301 and the monitor unit 302, as shown in FIG. 3A and FIG. 3B.

As shown in FIG. 10, the imaging unit 301 comprises a controlling unit 310, an imaging device 311, a storing unit 312, a communication controlling unit 313, and a sensor unit 314. The imaging device 311 includes an imaging element such as CCD and/or CMOS, an electronic shutter, a timing controlling circuit, a zooming mechanism and a hand shake correcting mechanism (not shown). The storing unit 312 stores still images, continuously photographed images, and a moving image. The storing unit 312 is used as a work memory, too. The communication controlling unit 313 serves to make wireless communicate with the monitor unit 302. Not only Bluetooth (Registered trademark) but also Wi-Fi and the infrared light communication are employed to communicate with the monitor unit 302. It is possible for the imaging unit 301 to connect to the Internet through the smartphone. The controlling unit 310 includes CPU and a program, and controls the whole operation of the imaging unit 301. The sensor unit 314 comprises various sorts of sensors to be described later.

As shown in FIG. 10, the monitor unit 302 comprises a controlling unit 320, a communication controlling unit 321, a storing unit 322, a displaying unit 323, an operation unit 324, and a sensor unit 325. The communication controlling unit 321 serves to make wireless communicate with the imaging unit 301. The storing unit 322 stores still images, continuously photographed images, and a moving image sent from the imaging unit 301 through the communication controlling units 313, 321. The storing unit 322 is used as a work memory, too. The displaying unit 323 displays the images sent from the imaging unit 301, and the images and menus stored in the storing unit 322. It is possible to integrate the displaying unit 323 with a touch panel. The operation unit 324 is operated by the user to enter various instructions. The touch panel can be used as the operation unit 324. The controlling unit 320 includes CPU and a program, and controls the whole operation of the monitor unit 302. The sensor unit 325 comprises various sorts of sensors to be described later.

The sensor unit 314 and sensor unit 325 will be described. The camera system 300 is equipped with plural sensors, and the imaging unit 301 automatically performs a shooting operation (photographing operation) depending on an output of the sensors. The sensors used in the sensor unit 314 and sensor unit 325 can be the same one or different one. In the present embodiment, it is important to make the operation of the imaging unit 301 located separately link with an indication on the monitor unit 302, and therefore the sensor unit 314 of the imaging unit 301 is an essential element.

The sensors employed in the sensor unit 325 and/or sensor unit 314 are used for measuring a state in which the monitor unit 302 is held, and comprises a speed sensor, acceleration sensor, gyro sensor (angular velocity sensor), altitude sensor, GPS (position detection), watch (time detection), step sensor (step detection), microphone (sound detection), atmospheric pressure sensor, and temperature sensor. The sensors of the sensor unit 325 and sensor unit 314 are not restricted to these sensors but others can be used.

The shutter timing of the imaging unit 301 is confirmed depending on the outputs of these sensors, and the means for confirming the shutter timing can be carried out by the controlling unit 320 of the monitor unit 302 or by the controlling unit 310 of the imaging unit 301. When the controlling unit 320 of the monitor unit 302 is to confirm the shutter timing, the controlling unit 320 sends a control signal indicating the shutter timing to the imaging unit 301 when the shutter timing has been confirmed in the monitor unit 302. When the controlling unit 310 of the imaging unit 301 is to confirm the shutter timing, the controlling unit 310 of the imaging unit 301 receives a sensing signal from the monitor unit 302, confirming the shutter timing to perform an imaging process.

<Operation of Camera Systems>

The operation of the camera system 300 will be described. In the camera system 300, the sensor unit 314 of the imaging unit 301 detects that the icon is being touched while the icon indicated on the displaying unit 323 of the monitor unit 302 is being touched by the user, and the operation mode of the camera system and/or the indication on the displaying unit 323 are changed depending on the output of the sensor unit 314.

Figure 11A:
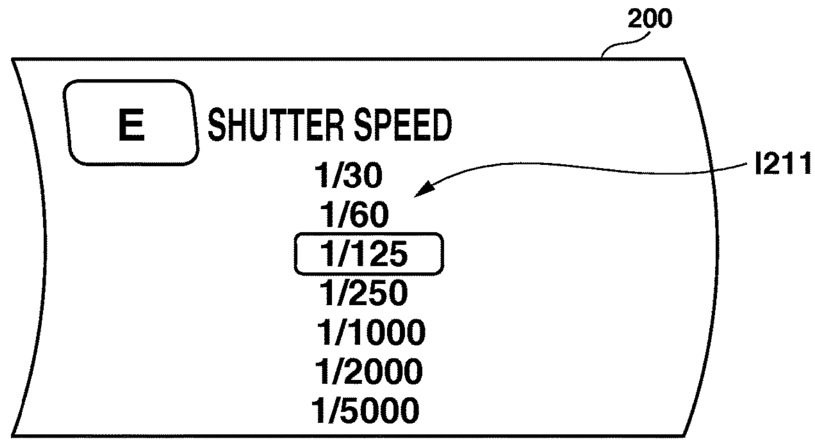
FIG. 11A is a view showing the icon "E" representing shutter speed in the camera system according to the third embodiment of the invention.

FIG. 11A is a view showing the icon "E" indicated on the displaying unit 323, representing a shutter speed. When the user touches the icon "E" indicated on the displaying unit 323 of the monitor unit 302 and keeps touching the icon "E", the sensor unit 314 of the imaging unit 301 detects movement of the imaging unit 301, and the photographing mode and the indication on the displaying unit 323 are changed.

In the monitor unit 302 displayed in FIG. 3B, when the user touches the icon "E" on the displaying unit 323, a shutter speed setting mode is set, and a shutter speed item 1211, 1/30 to 1/5000, is indicated, as shown in FIG. 11A. While the user keeps touching the icon "E" as displayed in FIG. 11A, the sensor unit 314 of the imaging unit 301 detects movement of the imaging unit 301. The faster the detected movement of the imaging unit 301, the more downward the shutter speed item 1211 to be selected moves on the displaying unit 323, and the slower the detected movement of the imaging unit 301, the more upward the shutter speed item 1211 to be selected moves on the displaying unit 323. When a still image shooting operation or a continuous shooting image operation is performed at a timing, a still image or still images will be photographed at a shutter speed selected at that timing. Therefore, when the imaging unit 301 moves faster, the image(s) will be photographed at a higher shutter speed, and when the imaging unit 301 moves slower, the image(s) will be photographed at a lower shutter speed.

Figure 11B:
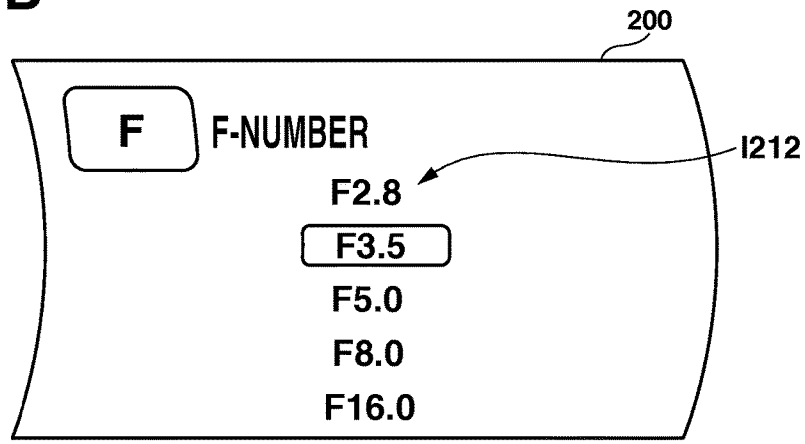
FIG. 11B is a view showing the icon "F" representing F-number in the camera system according to the third embodiment of the invention.

FIG. 11B is a view showing the icon "F" indicated on the displaying unit 323, representing F-number. When the user touches the icon "F" on the displaying unit 323 of the monitor unit 302 and keeps touching the icon "F", the sensor unit 314 of the imaging unit 301 detects movement of the imaging unit 301, and the photographing mode and the indication on the displaying unit 323 are changed.

In the monitor unit 302 displayed in FIG. 3B, when the user touches the icon “F” indicated on the displaying unit 323, an F-number setting mode is set, and an F-number item 1212, F2.8 to F16.0, is indicated, as shown in FIG. 11B. While the user keeps touching the icon “F” as displayed in FIG. 11B, the sensor unit 314 of the imaging unit 301 detects movement of the imaging unit 301. The faster the detected movement of the imaging unit 301, the more downward the F-number item 1212 to be selected moves on the displaying unit 323, and the slower the detected movement of the imaging unit 301, the more upward the F-number item 1212 to be selected moves on the displaying unit 323. When a still image shooting operation or a continuous shooting image operation is performed at a timing, a still image or still images will be photographed with the F-number selected at that timing. Therefore, when the imaging unit 301 moves faster, the image(s) will be photographed with an increasing F-number, and when the imaging unit 301 moves slower, the image(s) will be photographed with a decreasing F-number.

Figure 11C:
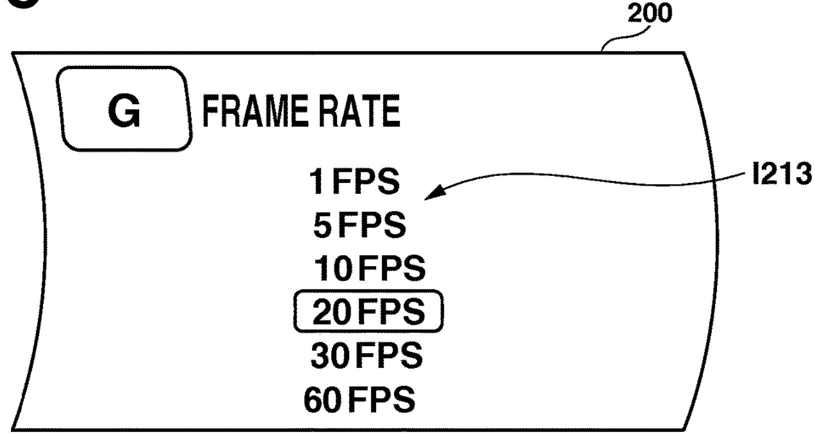
FIG. 11C is a view showing the icon "G" representing a frame rate in the camera system according to the third embodiment of the invention.

FIG. 11C is a view showing the icon “G” indicated on the displaying unit 323, representing a frame rate. When the user touches the icon “G” on the displaying unit 323 of the monitor unit 302 and keeps touching the icon “G”, the sensor unit 314 of the imaging unit 301 detects movement of the imaging unit 301, and the photographing mode and the indication on the displaying unit 323 are changed.

In the monitor unit 302 displayed in FIG. 3B, when the user touches the icon “G” on the displaying unit 323, a frame rate setting mode is set, and a frame rate item 1213, 1 FPS (Frame Per Second) to 60 FPS, is indicated, as shown in FIG. 11C. While the user keeps touching the icon “G” as displayed in FIG. 11C, the sensor unit 314 of the imaging unit 301 detects movement of the imaging unit 301. The faster the detected movement of the imaging unit 301, the more downward the frame rate item 1213 to be selected moves on the displaying unit 323, and the slower the detected movement of the imaging unit 301, the more upward the frame rate item 1213 to be selected moves on the displaying unit 323. When a still image shooting operation or a continuous shooting image operation is performed at a timing, a still image or still images will be photographed at a frame rate selected at that timing. Therefore, when the imaging unit 301 moves faster, the image(s) will be photographed at a higher frame rate, and when the imaging unit 301 moves slower, the image(s) will be photographed at a lower frame rate.

Although specific embodiments of the invention have been described in the foregoing detailed description, it will be understood that the invention is not limited to the particular embodiments described herein, but modifications and rearrangements may be made to the disclosed embodiments while remaining within the scope of the invention as defined by the following claims. It is intended to include all such modifications and rearrangements in the following claims and their equivalents.—

DESCRIPTION OF REFERENCE NUMBERS AND SIGNS

1: wrist type terminal apparatus
3: controlling unit
4: RAM
5: ROM
6: RTC
7: input unit
8: accelerometer
9: display driving unit
10: displaying unit
11: touch panel
100: glasses-type information apparatus
100A: main body
100B: bows
100C: ear hangings
110: CPU
112: program memory
114: work memory
116: camera unit
120: image memory
122: sensor unit
124: GPS
126: watch unit
128: sensor controlling unit
130: sensor memory
132: display controlling unit
134: projection unit
136: screen
138: microphone unit
139: microphone controlling unit
140: memory block
144: input controlling unit
146: communication controlling unit
148: I/O unit
150: controlling block
160: sight-line detecting unit
200: imaginary screen
300: camera system
301: imaging unit
302: monitor unit
311: imaging device
313: communication controlling unit
314: sensor unit
322: storing unit
323: displaying unit
324: operation unit
325: sensor unit
I101: year item
I102: month item
I103: day item
I104: day-of-week item
I105: hour item
I106: minute item
IC1, IC2, IC3: icons
ICH1, ICH2, ICH3: home buttons
1201: step item
1202: Km/h item
1203: title item
1204: volume item
1211: shutter speed item
1212: F-number item
1213: frame rate item

What is claimed is:

1. A system comprising:

a first apparatus comprising:

an imaging device comprising an image sensor configured to acquire one or more images, wherein the imaging device is configured to have a photographing mode that is settable to a designated setting of a plurality of settings; and a first apparatus wireless transmitter/receiver;

a second apparatus physically separate from the first apparatus, the second apparatus comprising:

a display configured to display at least the designated setting of the plurality of settings of the photographing mode;

a second apparatus wireless transmitter/receiver configured to wireless communicate with the first apparatus wireless transmitter/receiver of the first apparatus; and a sensor configured to sense a movement of the second apparatus; and a controller arranged in one of the first apparatus and the second apparatus, wherein the controller is configured to:

designate a setting of the plurality of settings of the photographing mode of the imaging device of the first apparatus as the designated setting based on the movement of the second apparatus sensed by the sensor; and set the photographing mode of the imaging device of the first apparatus to the designated setting.

2. The system according to claim 1, wherein the controller is arranged to the second apparatus, wherein the controller is configured to:

generate a control signal based on the designated setting, and control the second apparatus wireless transmitter/receiver to transmit the control signal to the first apparatus wireless transmitter/receiver, and wherein the first apparatus wireless transmitter/receiver is configured to receive the control signal transmitted from the second apparatus wireless transmitter/receiver, and wherein the imaging device comprising the image sensor is configured to acquire the one or more images in the photographing mode set at the designated setting based on the control signal received by the first apparatus wireless transmitter/receiver.

3. The system according to claim 1, wherein the controller is arranged to the first apparatus, wherein the second apparatus wireless transmitter/receiver is configured to transmit a sensing signal, wherein the sensing signal is based on the movement of the second apparatus sensed by the sensor, wherein the first apparatus wireless transmission/receiver is configured to receive the sensing signal transmitted from the second apparatus wireless transmitter/receiver, and wherein the controller is configured to:

designate the setting of the plurality of settings as the designated setting based on the sensing signal; and set the photographing mode of the imaging device to the designated setting.

4. The system according to claim 1, wherein the photographing mode is a shutter speed of the imaging device, wherein the plurality of settings is a plurality of shutter speed values, and the designated setting is a designated shutter speed value of the plurality of shutter speed values, wherein the sensor is configured to sense a speed of the movement of the second apparatus, and wherein the controller is configured to:

designate a shutter speed value of the plurality of shutter speed values as the designated shutter speed value, and set the shutter speed of the imaging device to the designated shutter speed value.

5. The system according to claim 1, wherein the photographing mode is an F-number of the imaging device, wherein the plurality of settings is a plurality of F-number values, and the designated setting is a designated F-number value of the plurality of F-number values, wherein the sensor is configured to sense a speed of the movement of the second apparatus, and wherein the controller is configured to:

designate an F-number value of the plurality of F-number values as the designated F-number value, and set the F-number of the imaging device to the designated F-number value.

6. The system according to claim 1, wherein the photographing mode is a frame rate of the imaging device, wherein the plurality of settings is a plurality of frame rate values, and the designated setting is a designated frame rate value of the plurality of frame rate values, wherein the sensor is configured to sense a speed of the movement of the second apparatus, and wherein the controller is configured to:

designate a frame rate value of the plurality of frame rate values as the designated frame rate value, and set the frame rate of the imaging device to the designated frame rate value.

7. The system according to claim 1, wherein the controller is configured to:

receive a designation of the photographing mode from a plurality of photographing modes; and in response to receiving the designation of the photographing mode from the plurality of photographing modes:

designate the setting of the plurality of settings as the designated setting based on the movement sensed by the sensor; and set the photographing mode of the imaging device to the designated setting.

8. A method for controlling a system comprising:

a first apparatus comprising:

an imaging device comprising an image sensor configured to acquire one or more images, wherein the imaging device is configured to have a photographing mode that is settable to a designated setting of a plurality of settings; and a first apparatus wireless transmitter/receiver; and a second apparatus physically separate from the first apparatus, the second apparatus comprising:

a display configured to display at least the designated setting of the plurality of settings of the photographing mode;

a second apparatus wireless transmitter/receiver configured to wireless communicate with the first apparatus wireless transmitter/receiver of the first apparatus; and a sensor configured to sense a movement of the second apparatus;

wherein the method comprises:

designating a setting of the plurality of settings of the photographing mode of the imaging device of the first apparatus as the designated setting based on the movement of the second apparatus sensed by the sensor; and setting the photographing mode of the imaging device of the first apparatus to the designated setting.

9. A non-transitory computer-readable storage medium with an executable program stored thereon for controlling a system comprising:

a first apparatus comprising:

an imaging device comprising an image sensor configured to acquire one or more images, wherein the imaging device is configured to have a photographing mode that is settable to a designated setting of a plurality of settings; and a first apparatus wireless transmitter/receiver; and a second apparatus physically separate from the first apparatus, the second apparatus comprising:

a display configured to display at least the designated setting of the plurality of settings of the photographing mode;

a second apparatus wireless transmitter/receiver configured to wireless communicate with the first apparatus wireless transmitter/receiver of the first apparatus; and a sensor configured to sense a movement of the second apparatus;

wherein the executable program causes a controller to:

designate a setting of the plurality of settings of the photographing mode of the imaging device of the first apparatus as the designated setting based on the movement of the second apparatus sensed by the sensor; and set the photographing mode of the imaging device of the first apparatus to the designated setting.

* * * * *